US008160660B2

(12) United States Patent
Tashiro

(10) Patent No.: US 8,160,660 B2
(45) Date of Patent: Apr. 17, 2012

(54) DUAL SLIDE PORTABLE TERMINAL

(75) Inventor: Hiroshi Tashiro, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 757 days.

(21) Appl. No.: 11/878,227

(22) Filed: Jul. 23, 2007

(65) Prior Publication Data
US 2008/0051161 A1 Feb. 28, 2008

(30) Foreign Application Priority Data

Jul. 28, 2006 (JP) ................................ 2006-205725

(51) Int. Cl.
H04M 1/00 (2006.01)
(52) U.S. Cl. .................................. 455/575.4; 455/575.1
(58) Field of Classification Search ............... 455/575.1, 455/575.4
See application file for complete search history.

(56) References Cited

U.S. PATENT DOCUMENTS

| 6,934,518 | B2 * | 8/2005 | Cheng ........................... 455/90.3 |
| 7,187,363 | B2 * | 3/2007 | Nguyen et al. ................. 345/168 |
| 7,574,241 | B2 * | 8/2009 | Ahn et al. ................... 455/575.1 |
| 2002/0135993 | A1 | 9/2002 | Ueyama et al. |
| 2002/0187803 | A1 | 12/2002 | Nakamura et al. |
| 2003/0125081 | A1 * | 7/2003 | Boesen .......................... 455/556 |
| 2003/0171133 | A1 * | 9/2003 | Mizuta et al. ................. 455/550 |
| 2003/0179555 | A1 | 9/2003 | Hemmi et al. |
| 2004/0162036 | A1 | 8/2004 | Park |
| 2004/0189597 | A1 * | 9/2004 | Amitani et al. ................ 345/156 |
| 2004/0204197 | A1 * | 10/2004 | Moon ......................... 455/575.1 |
| 2005/0052837 | A1 | 3/2005 | Kota et al. |
| 2005/0083642 | A1 * | 4/2005 | Senpuku et al. ............... 361/681 |
| 2005/0090298 | A1 * | 4/2005 | Park et al. ................... 455/575.4 |
| 2005/0104856 | A1 | 5/2005 | Jacobs et al. |
| 2005/0255897 | A1 | 11/2005 | Lee et al. |
| 2006/0046796 | A1 * | 3/2006 | Park et al. ................... 455/575.4 |
| 2006/0061943 | A1 | 3/2006 | Santos et al. |
| 2006/0146014 | A1 | 7/2006 | Lehtonen |
| 2007/0082718 | A1 * | 4/2007 | Yoon et al. .................. 455/575.4 |
| 2007/0123318 | A1 * | 5/2007 | Joo ............................ 455/575.1 |
| 2007/0135181 | A1 | 6/2007 | Ohki et al. |
| 2007/0142101 | A1 * | 6/2007 | Seshagiri et al. ........... 455/575.4 |
| 2007/0254730 | A1 * | 11/2007 | Kim et al. ................... 455/575.4 |
| 2007/0270107 | A1 * | 11/2007 | Vanska et al. ................ 455/90.3 |

(Continued)

FOREIGN PATENT DOCUMENTS

CN 1694466 A 11/2005

(Continued)

Primary Examiner — Christopher M Brandt
(74) Attorney, Agent, or Firm — Birch, Stewart, Kolasch & Birch, LLP

(57) ABSTRACT

A dual slide portable terminal includes a first housing having a surface and a rear surface; a second housing having a surface; and a dual slide coupling mechanism coupling the first and second housings to each other. The coupling mechanism includes: a first translation mechanism coupling the first housing to the second housing in a manner allowing longitudinal translation movement of the first housing relative to the second housing between a first posture in which the surface of second housing is covered by the rear surface of first housing and a second posture in which the surface of the second housing is exposed; and a second translation mechanism coupling the first housing to the second housing in a manner allowing lateral translation movement of the first housing relative to the second housing between the first posture and a third posture in which the surface of second housing is exposed.

11 Claims, 7 Drawing Sheets

U.S. PATENT DOCUMENTS

2008/0318645 A1 * 12/2008 Takamori et al. .......... 455/575.4

FOREIGN PATENT DOCUMENTS

| | | |
|---|---|---|
| DE | 203 17 865 U1 | 3/2004 |
| GB | 2 407 933 | 11/2005 |
| JP | 2002-368440 A | 12/2002 |
| JP | 2003-249987 A | 9/2003 |
| JP | 2004-204950 A | 7/2004 |
| JP | 2004-222173 A | 8/2004 |
| JP | 2004-312846 A | 11/2004 |
| JP | 2005-341480 A | 12/2005 |
| JP | 2006-019925 | 1/2006 |
| KR | 10-2006-0032382 A | 4/2006 |
| KR | 10-0630869 B1 | 9/2006 |
| KR | 10-2007-0024299 A | 3/2007 |
| WO | WO-2006/041238 A1 | 4/2006 |
| WO | WO-2006/072657 A1 | 7/2006 |
| WO | WO 2006106374 A1 * | 10/2006 |

* cited by examiner

DUAL SLIDE PORTABLE TERMINAL

CROSS-REFERENCE TO RELATED APPLICATION

This nonprovisional application claims priority under 35 U.S.C. §119(a) on Patent Application Ser. No. 2006-205725 filed in Japan on Jul. 28, 2006, the entire contents of which are hereby incorporated by reference.

BACKGROUND OF THE INVENTION

1. Field of the Invention

The present invention relates to a small portable terminal and, more specifically, to a portable terminal having many functions where amount of information input/output varies in accordance with the functions.

2. Description of the Background Art

Recently, a small portable terminal, represented by a portable telephone, that can be held by one hand comes to incorporate various functions. For example, it incorporates functions of a portable terminal such as a telephone and a personal computer, mainly including communication functions represented by telephone (conversation) function, as well as creation, transmission and display of electronic mails. Along with the increasing number of functions, many proposals on device structures have been made that allow operations in different forms suitable for the states of use of the portable terminal.

US2004/189597A1 discloses foldable and slidable type portable telephones. When the portable telephone is put in a bag or a pocket, an upper case is folded or slid to close and hide an operating panel on the lower case, in order to prevent unintentional button operation. At the same time, in order to allow simple operation such as checking an incoming mail while the portable telephone is closed, an opening (for a folding type) or a U-shaped cutout (for a sliding type) is formed on the upper case, so that the user can manipulate a pointing device provided on a surface of the lower case through the opening or the cutout.

US2005/052837A1 discloses a portable terminal having two wedge-shaped bodies slidably coupled to each other to provide space margin mainly for positioning a camera mechanism. The wedge-shaped bodies are normally combined to form a rectangular box, allowing compact storage. At the time of use, the bodies are slid with respect to each other, so that the overall body comes to have a prescribed length convenient for use. As the body is wedge-shaped, the portion corresponding to the bottom of the wedge is thick enough to accommodate camera or other mechanism with ample room.

Japanese Patent Laying-Open 2006-19925 (FIGS. 16, 47 to 49, 55 and 56) discloses a portable terminal having a function mainly allowing viewing of television (hereinafter denoted as "TV") broadcast (typically, 1-segment broadcasting service in Japan for distributing TV broadcast to portable terminals.). The portable terminal includes a first case having an operation panel and a second case having a display, and by rotational sliding, it is possible to switch between a state in which the operation panel of the first case is covered with the second case, and a state in which the operation panel of the first case is exposed and the display of the second case is set in lateral (landscape) arrangement. Particularly, a mechanism is adopted that allows easy, one-hand operation for rotationally sliding the second case.

As the 1-segment broadcasting service has started, the function allowing viewing of TV broadcast would be an important requirement for future portable terminals. For satisfactory viewing of TV broadcast, a display screen is preferred to be as large as possible and landscape display capability is desired. Further, for the purpose of playing games on portable terminal displays, which are now popular, a display screen as large as possible and allowing both landscape and portrait arrangements is desired.

At the same time, in order to realize other functions of the portable terminal, it is also necessary to provide relatively large number of buttons and the like, such as numeric buttons and cursor keys. Particularly, when an application requiring relatively frequent text input, such as electronic mailing, is to be implemented, a considerably large number of buttons must be provided. Most of such buttons, however, are unnecessary when one views TV broadcast or plays a game and, these buttons are rather troublesome as unintended touching may cause erroneous operation. Therefore, it is preferred that such buttons are hidden at the time of receiving TV broadcast or playing a game.

In the portable telephone disclosed in US2004/189597A1, when one views TV broadcast on a main display, the operation panel is exposed, no matter whether the telephone is the foldable type or slidable type. In such a state, the user is forced to view the TV broadcast while paying attention not to erroneously touch any of the buttons. As a result, the user may feel it a bother. The foldable type may allow the user to view TV on a sub-display provided on a rear surface, with the portable telephone kept folded; however, the sub-display might be too small to enjoy a TV program.

The portable terminal described in US2005/052837A1 has operating portions not directly related to TV viewing, such as a camera and camera operating buttons, arranged on a side surface, and the operating portions are always operable no matter whether the bodies are extended or not. In this case also, the user must pay attention not to erroneously press any button unrelated to TV viewing, and hence, carefree TV viewing is not expected.

The portable terminal described in Japanese Patent Laying-Open No. 2006-019925 realizes both portrait and landscape displays, and switching from the portrait to landscape display can be realized advantageously with one hand. The structure of the terminal, however, is such that all buttons and the like are hidden in the portrait display state, and all the buttons and the like are exposed in the landscape display state. As a result, when the user views TV with the portrait display of the device disclosed in Japanese Patent Laying-Open No. 2006-019925, quick key operation is impossible. When one views TV with the landscape display, on the contrary, all the buttons and the like are exposed, and hence, it would be difficult to enjoy TV broadcast, as care is demanded to avoid erroneously touching buttons and the like. In order to avoid such a problem, a special consideration is necessary. For example, a channel switch button is placed right beside the display portion.

Further, though the portable terminal described in Japanese Patent Laying-Open No. 2006-019925 allows switching between portrait display and landscape display with one hand, the direction of display is rotated by 90° before and after the switching in either direction. As the display is rotated when the posture is switched, it is necessary to change the manner of display in accordance with the posture and the manner of use after the posture is switched with one hand, and such an operation might be so troublesome as to cancel the advantage of easy posture switching with one hand.

Along with increasing functions of portable terminals such as portable telephones as described above, the amount of text to be input through the operating portion has been increasing. In any of the terminals according to US2004/189597A1, US2005/052837A1 and Japanese Patent Laying-Open No. 2006-019925, however, the number of buttons or keys arranged on the operating portion is limited. As a result, an input method must be adopted in which a plurality of characters are allocated to one button or one key and a desired character is input by pressing one key a number of times. Such an input method is problematic, as the input takes much time. A clear solution to this problem is to provide larger number of buttons or keys. However, increase in size of a portable terminal is limited, and the number of buttons is desired to be as small as possible to prevent exposure of unnecessary buttons when viewing TV. Under the circumstances, a solution has not been found. Thus, the user cannot use the portable terminal with optimal key configuration suitable for the state of use.

SUMMARY OF THE INVENTION

Therefore, an object of the present invention is to provide a portable terminal that can be switched to a posture suitable for an application without affecting display, not susceptible to erroneous operation and allowing smooth operation.

Another object of the present invention is to provide a portable terminal that can be switched to a posture suitable for an application without affecting display, providing key configuration not susceptible to erroneous operation and allowing smooth operation.

According to a first aspect of the present invention, a portable terminal includes: a first housing having a first surface with a display arranged, and a second surface as a rear surface of the first surface; a second housing having a first surface; and a coupling mechanism coupling the first housing and the second housing to each other. The coupling mechanism includes a first translation mechanism coupling the first housing to the second housing in a manner allowing translation movement of the first housing relative to the second housing along a prescribed first trajectory, between a first posture in which the first surface of the second housing is covered by the second surface of the first housing and a second posture in which the first surface of the second housing is exposed, and a second translation mechanism coupling the first housing to the second housing in a manner allowing translation movement of the first housing relative to the second housing along a second trajectory different from the first trajectory, between the first posture and a third posture in which the first surface of the second housing is exposed.

By the coupling mechanism, the first surface of the second housing is covered by the first housing in the first posture, and when the posture is changed from the first posture to the second and third postures by translation, the first surface of the second housing is exposed. It is noted, however, that the trajectory of translation when the posture is changed from the first posture to the second posture is different from that when the posture is changed from the first posture to the third posture. As the changes in posture are both realized by the translation mechanism, the posture of display in the first posture is kept unchanged. Therefore, the posture of the portable terminal can be switched among the first, second and third postures without any influence on the manner of display on the display screen. As a result, even when the posture is switched to one suitable for the application, the portable terminal can be used comfortably without any influence on the display.

Preferably, on the first surface of the second housing, input/output devices for operation of an application using the display are arranged. The configuration of the input/output devices exposed in the second posture is different from the configuration of the input/output devices exposed in the third posture.

The configuration of input/output devices exposed in the second posture is different from that exposed in the third posture. When the configurations and arrangements of the input/output devices are determined in advance in accordance with the applications to be executed in the second and third postures, it becomes possible to have input/output devices used in the corresponding posture exposed and those not used in the posture unexposed as much as possible. As a result, a portable terminal that can be switched to a posture suitable for an application without affecting display, not susceptible to erroneous operation and allowing smooth operation can be provided.

The display has an approximately rectangular shape with longer and shorter sides; the first trajectory forms a line in a direction parallel to the shorter side; and the second trajectory forms a line in a direction parallel to the longer side.

By moving the first housing along the directions parallel to the longer side and shorter side of the display, the posture can be switched among the first, second and third postures. Movement in such directions is intuitive and easy to understand, and does not require difficult operation. As a result, a portable terminal that can be easily switched to a posture suitable for an application, not affecting display even when the posture is switched, and allowing smooth operation can be provided.

When we represent height of the second housing parallel to the shorter side of display by Cy, width parallel to the longer side of display by Cx, distance of movement of the first housing relative to the second housing in the direction of shorter side of the display by Gy and the distance of movement in the direction of longer side of the display by Gx, these values may be determined to satisfy the following relation:

$$Gx/Cx < Gy/Cy.$$

As described above, according to the present invention, the portable terminal can be switched easily to a posture suitable for an application. Even in that case, the display is not influenced, while the configuration of exposed input/output devices is changed and hence possibility of erroneous operation can be reduced. Therefore, the user can use the portable terminal comfortably.

According to a second aspect of the present invention, a portable terminal includes: a first housing having a first surface with a display arranged, and a second surface as a rear surface of the first surface; an input device having an operating surface for operation of an application using the display; a first translation mechanism coupling the first housing to the input device in a manner allowing translation movement of the housing along a prescribed first trajectory relative to the input device, between a first posture in which the operating surface is covered by the second surface and a second posture in which the operating surface is exposed; and a second translation mechanism coupling the first housing to the input device in a manner allowing translation movement of the first housing along a second trajectory different from the first trajectory relative to the input device, between the first posture and a third posture in which the operating surface is exposed.

By the first and second translation coupling mechanism, the operating surface of the input device is covered by the first housing in the first posture and when the posture is changed from the first posture to the second and third postures by translation, the operating surface of the input device is exposed. It is noted, however, that the trajectory of translation when the posture is changed from the first posture to the second posture is different from that to the third posture. As the changes in posture are both realized by the translation mechanism, the posture of display in the first posture is kept unchanged. Therefore, the posture of the portable terminal can be switched among the first, second and third postures without any influence on the manner of display on the display screen. By the switching, the exposed portion of the operating surface of the input device is changed. Even when the operating surface is exposed, it is partially hidden by the first housing. Therefore, possibility of erroneously operating the device arranged on the operating surface, which is now hidden, is eliminated. As a result, a portable terminal that can be switched to a posture suitable for an application without affecting display, allowing comfortable operation and not susceptible to erroneous operation can be provided.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
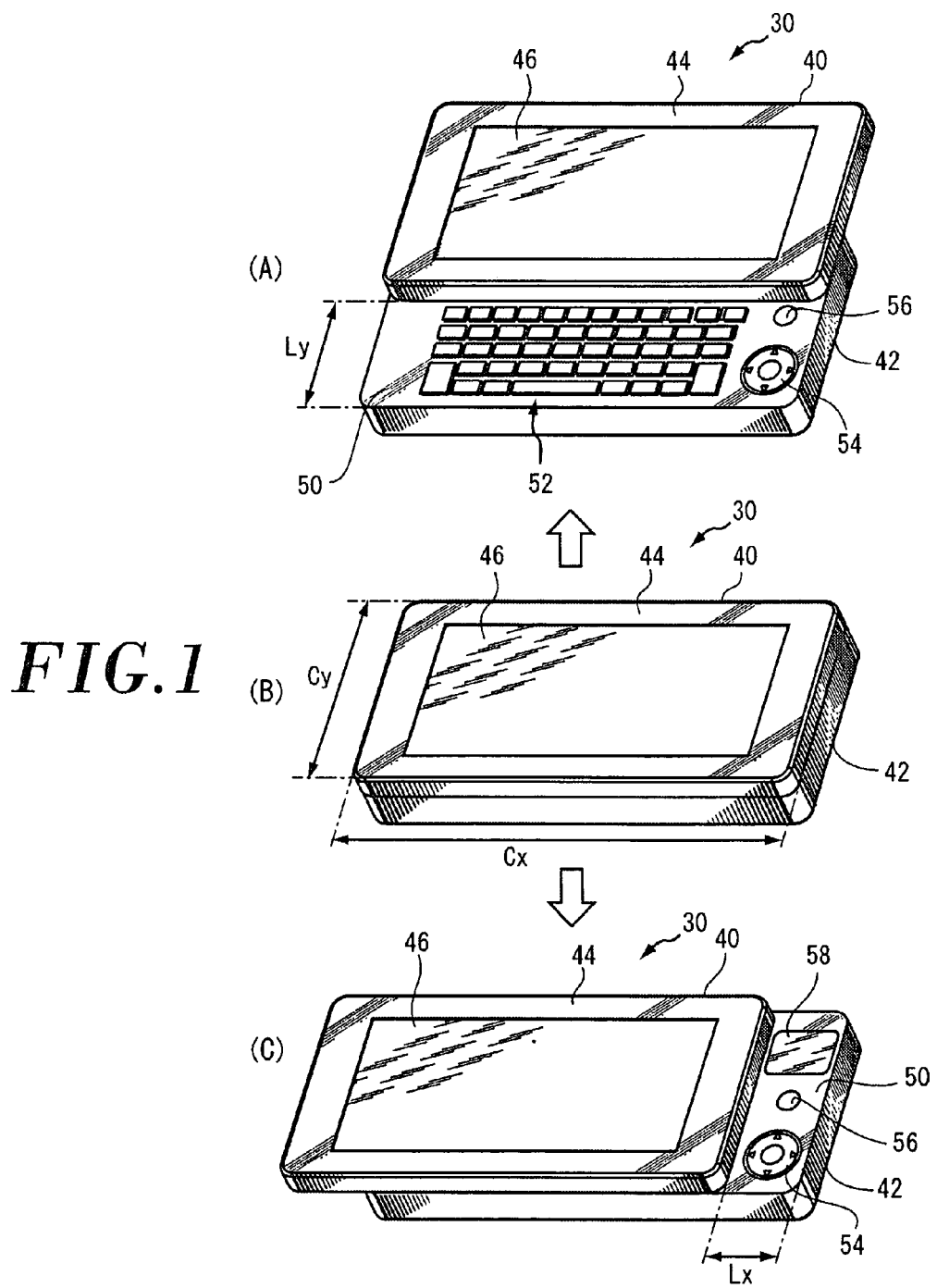
FIG. 1 shows three postures of a PDA (Personal digital Assistant) 30 as a portable terminal in accordance with a first embodiment of the present invention.

In the following, embodiments of the present invention will be described with reference to the figures. Throughout the figures, the same portions are denoted by the same reference characters, and they have the same names and functions. Therefore, detailed description thereof will not be repeated.

First Embodiment

FIG. 1 shows an appearance of PDA 30 as a portable terminal in accordance with the first embodiment of the present invention. Referring to FIG. 1(B), PDA 30 includes a first housing 40 of an approximately flat, rectangular box shape having an approximately rectangular upper surface 44 with a main display 46 arranged thereon and a lower surface (not shown) as a rear surface of upper surface 44; and a second housing 42 of an approximately flat, rectangular box shape similar to the first housing, coupled to the first housing 40 such that an upper surface thereof is covered entirely with the first housing 40. As will be described later, the second housing 42 has an input device for operating or inputting information to PDA 30 using display 46 on upper surface 44.

In PDA 30 in accordance with the present embodiment, the first and second housings 40 and 42 have approximately the same dimensions, and main display 46 has shorter side length of Cy and longer side length of Cx.

The first housing 40 is coupled to the second housing by a coupling mechanism, not shown in FIG. 1, such that it can slid by translation from the state shown in FIG. 1(B) to the upper direction in the figure by a distance Ly (Ly<Cy) along the shorter side of second housing 42, and it can slid by translation from the state shown in FIG. 1(B) to the left direction in the figure by a distance Lx (Lx<Cx) along the longer side of second housing 42. FIG. 1(A) shows the appearance of PDA 30 with the first housing 40 slid in the shorter side direction of second housing 42, and FIG. 1(C) shows the appearance of PDA 30 with the first housing 40 slid in the longer side direction of second housing 42, respectively. In the following, the posture shown in FIG. 1(B) will be referred to as the first posture, the posture shown in FIG. 1(A) will be referred to as the second posture, and the posture shown in FIG. 1(C) will be referred to as the third posture. Transition between the first and second postures will be referred to as longitudinal slide, and transition between the first and third postures will be referred to as lateral slide.

Both in longitudinal slide and lateral slide, the first housing 40 is translated relative to the second housing 42 and, therefore, when viewed from the user holding the second housing 42, the posture of main display 46 on the first housing 40 is unchanged. Therefore, it is unnecessary to switch the manner of display of main display 46 after changing the posture, and hence, operation is simple. In the present embodiment, directions of translation are two directions, that is, the direction parallel to the shorter side and the direction parallel to the longer side of main display 46, namely, directions parallel to the shorter side and longer side of approximately rectangular upper surface 44, and both result in linear movements. Such directions of movement allow intuitive operations of the user, and this approach is advantageous in that the user would not be confused in operation for changing the posture. It is noted, however, that translation is not limited to such straight lines, and directions thereof are not limited to directions parallel to the shorter and longer sides of main display 46. By way of example, the trajectory of movement of first housing 40 may draw a curve, or movement may be in a direction crossing the shorter and longer sides of main display 46 at a prescribed angle.

Figure 2:
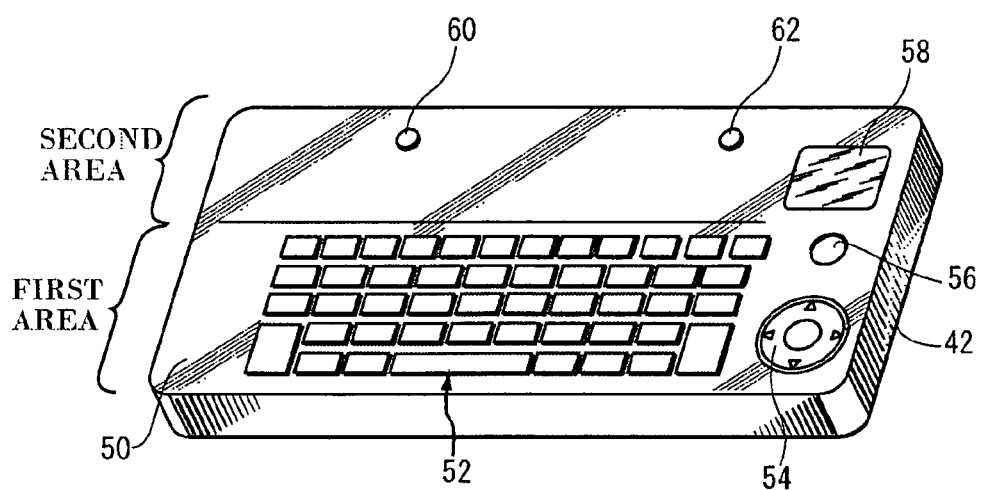
FIG. 2 shows an appearance of a second housing 42 of PDA 30.

FIG. 2 shows the appearance of second housing 42. Referring to FIG. 2, the second housing 42 is of an approximately flat, rectangular box shape, and has an upper surface 50 on which a number of main keys 52 used for character input and the like, a cursor key 54 used for moving a cursor, an enter key 56 for establishing an input, and a sub-display 58 capable of displaying an image independent from main display 46 are arranged. Main keys 52 are arranged slightly to the left from the center of upper surface 50. At positions of equal distance from an upper end in FIG. 2 of upper surface 50, two projections 60 and 62 are provided, which constitute part of the coupling mechanism mentioned above. In the present embodiment, projections 60 and 62 are arranged at symmetric positions on upper surface 50. Projections 60 and 62 form part of the coupling mechanism described above.

Upper surface 50 may be divided into a first area from the lower side to a distance Ly, and a second area from that position to the upper side. Main keys 52, cursor key 54 and enter key 56 are all provided in the first area. Sub-display 58 and projections 60 and 62 are all provided in the second area.

Figure 3:
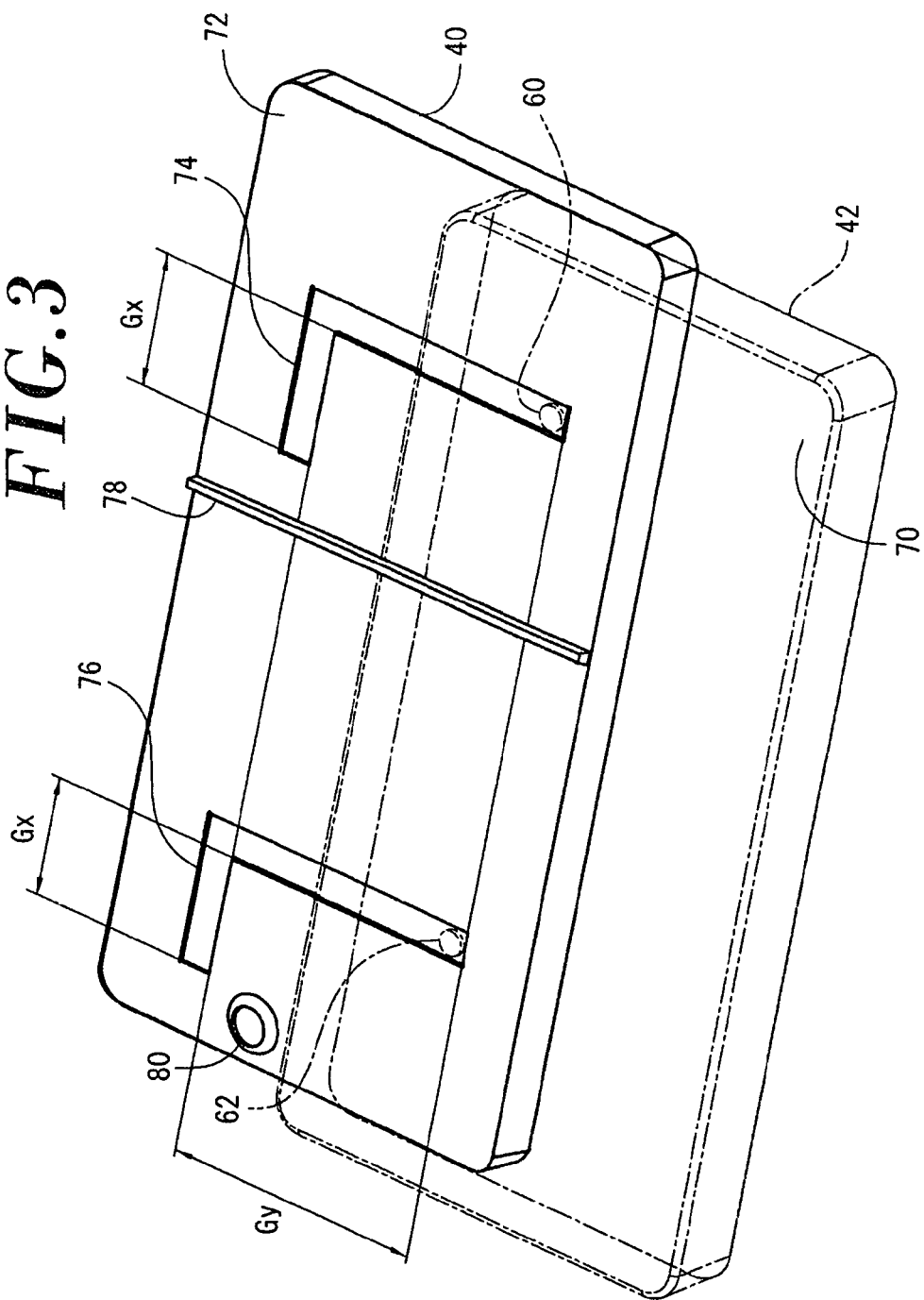
FIG. 3 shows a rear surface of a first housing 40 of PDA 30.

FIG. 3 schematically shows a structure of a rear surface 72 of first housing 40. Referring to FIG. 3, on rear surface 72 of first housing 40, a pair of L-shaped slide guides 74 and 76 forming a part of the coupling mechanism described above, and an FPC guide 78 for regulating lateral movement of a flexible printed board (not shown) for electrical connection between the first and second housings 40 and 42 are formed. Near the left end on FIG. 3 of rear surface 72, a camera lens 80 is provided. Camera lens 80 is normally unexposed, and it is exposed when PDA 30 is set to the second and third postures. When the camera is to be used in the second posture, main display 46 shown in FIG. 1 is used as a finder, and when it is used in the third posture, main display 46 may be turned off and sub-display 58 may be used as a finder.

As shown by chain-dotted lines in FIG. 3, projection 60 engages with slide guide 74, and projection 62 engages with slide guide 76, whereby a dual-slide mechanism coupling the second and first housings 42 and 40 slidable in two directions relative to each other is formed. Sliding directions are the shorter side and longer side directions of second housing 42. When projections 60 and 62 are at the tip ends of longer sides of slide guides 74 and 76, PDA 30 is in the second posture shown in FIG. 1(A); when they are at the tip ends of shorter sides, PDA 30 is in the third posture shown in FIG. 1(C); and when projections 62 and 64 are at the bent portions of slide guides 74 and 76, PDA 30 is in the first posture shown in FIG. 1(B). Therefore, the distance between the shorter side portions of slide guides 74 and 76 shown in FIG. 3 to the upper side of rear surface 72 of first housing 40 is approximately the same as the distance between projections 60 and 62 shown in FIG. 2 and the upper side of upper surface 50 of the second housing 42. Transition from the first posture to the second posture through translation is realized by the first translation mechanism, and transition between the first and third postures through translation is realized by the second translation mechanism.

When we represent the length of longer side portions of slide guides 74 and 76 by Gy and the length of shorter side portions by Gx, the following relation holds:

$$Gy=Ly$$

$$Gx=Lx.$$

FPC guide 78 is formed slightly to the right from the center in FIG. 3 of rear surface 72 of first housing 40, to be parallel to the shorter side of first housing 40 and slightly protruding from rear surface 72. FPC guide 78, together with FPC, will be described later.

Referring to FIG. 1(A), in the second posture, the first housing 40 is moved upward as shown in the figure by the distance Ly, and therefore, main keys 52, cursor key 54 and enter key 56 are exposed. In this state, text input is possible using main keys 52, cursor key 54 and enter key 56 while viewing main display 46. In the second posture, a relatively large area of upper surface 50 is exposed, and therefore, a large number of main keys 52 may be arranged, allowing high-speed text input.

Referring to FIG. 1(C), in the third posture, the first housing 40 is slid by the prescribed distance Lx to the left in the figure. As a result, a right end portion of upper surface 50 of second housing 42 (area having the width Lx) is exposed, allowing operation of cursor key 54 and enter key 56, and sub-display 58 is viewable. Of the upper surface 50, the area exposed in this state will be referred to as the third area, and the area not exposed will be referred to as the fourth area.

As shown in FIG. 1(B), when we represent the length of the longer side of second housing 42 by Cx and the length of shorter side by Cy, the values Gx, Gy, Cx and Cy are selected to satisfy the following relation:

$$Gx/Cx < Gy/Cy \quad (1).$$

From Equation (1), it can be understood that, in the present embodiment, the ratio occupied by the length of longitudinal slide with respect to the shorter side of second housing 42 is larger than the ratio occupied by the length of lateral slide with respect to the longer side. The reason for this is as follows. In the second posture, main operation is expected to be character input, and therefore, it is necessary to expose all main keys 52. The third posture is not used for character input, and expected use of this posture is TV viewing or playing games. Therefore, it is unnecessary to expose main keys 52, and it is rather preferred to keep main keys 52 unexposed.

When two L-shaped slide guides 74 and 76 are formed side by side in the lateral direction as shown in FIG. 3, there is naturally a restriction of $Gx < Cx/2$ imposed in addition to the restriction of Equation (1). Actually, main keys 52 occupy most of the upper surface 50. Therefore, in order not to expose main keys 52 in the third posture, the value Gx should preferably be smaller, to about $Gx = C/5$.

As shown in FIG. 1, even when slide movement between the first and second or first and third postures is to be attained, electronic circuits in the second housing 42 and the first housing 40 must be kept electrically connected. In the present embodiment, FPC 90 having a planer shape such as shown in FIG. 4 is used, interposed between the second housing 42 and the first housing 40.

Figure 4:
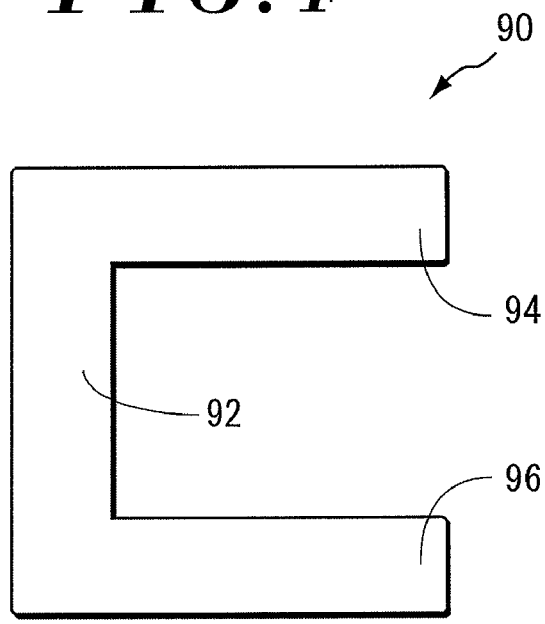
FIG. 4 shows a schematic planar shape of a flexible printed circuit board (hereinafter referred to as "FPC") 90 used in PDA 30.

Referring to FIG. 4, FPC 90 consists of a first-housing-side end portion 96 and a second-housing-side end portion 94 parallel to each other and having the same length, and a central portion connecting the end portions. These portions are all flexible and can be freely bent in a direction crossing the plane.

Figure 5:
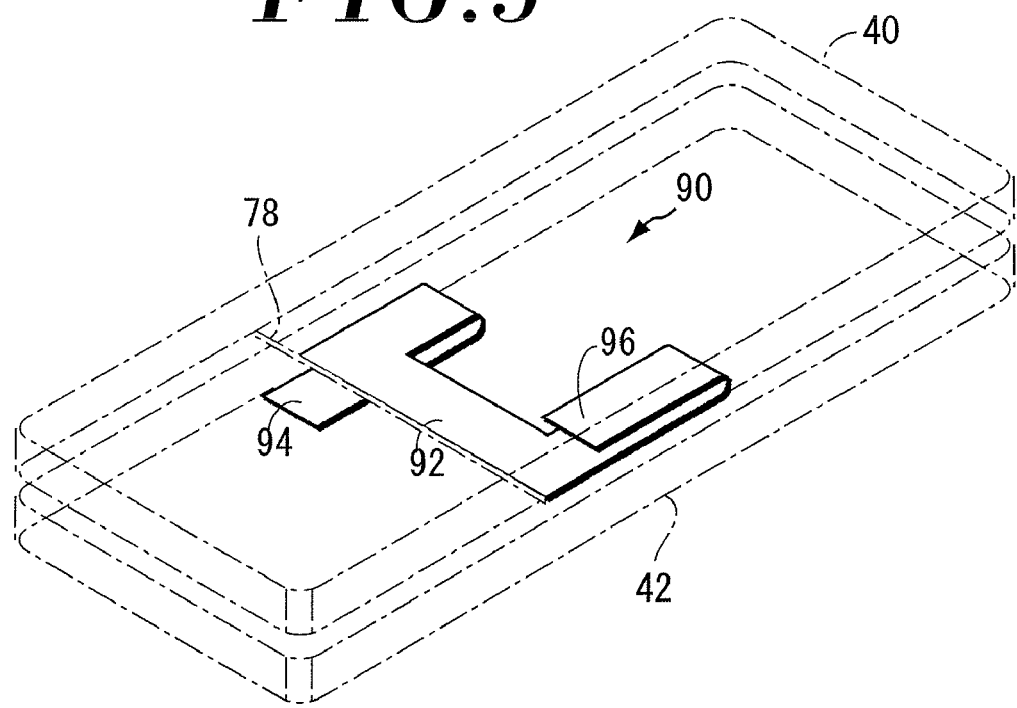
FIG. 5 shows the shape of FPC 90 in PDA 30 in the first posture.
Figure 6:
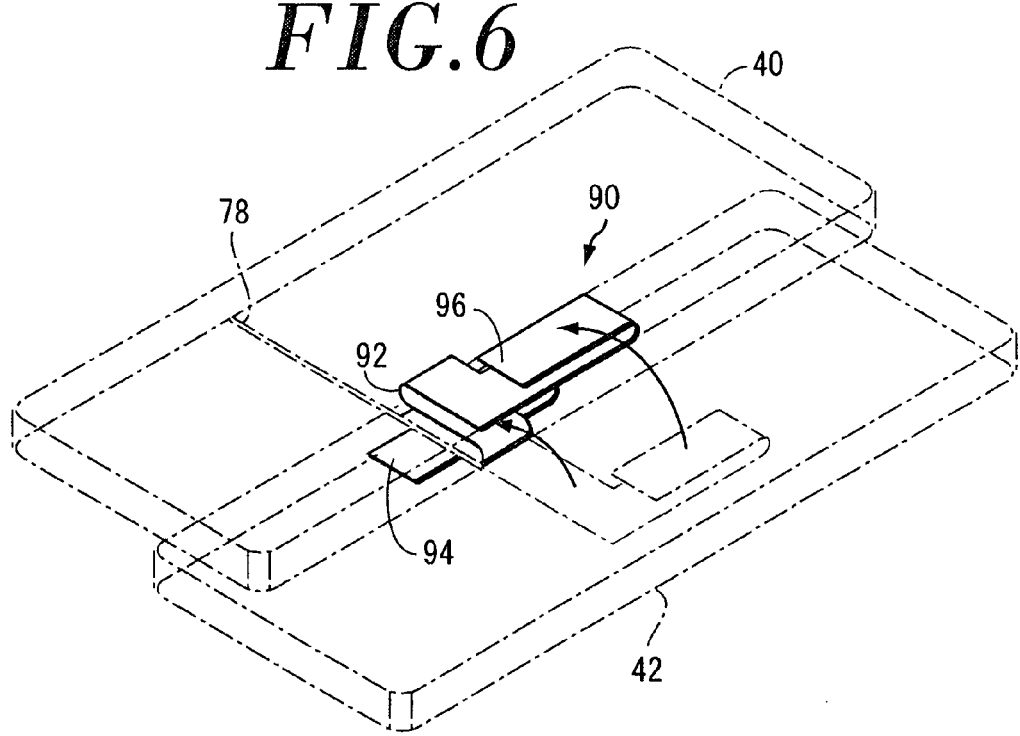
FIG. 6 shows the shape of FPC 90 in PDA 30 in the second posture.
Figure 7:
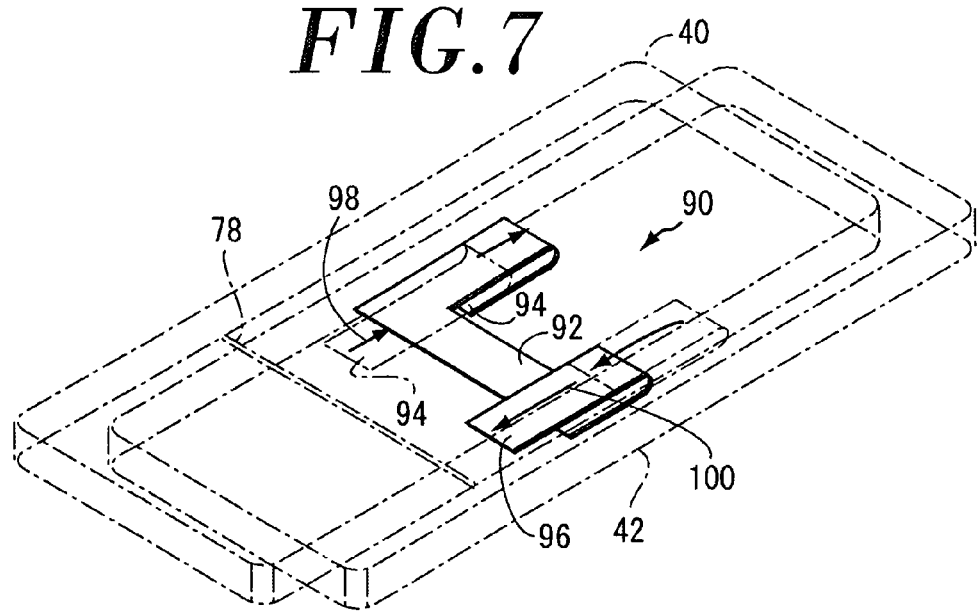
FIG. 7 shows the shape of FPC 90 in PDA 30 in the third posture.

FIG. 5 shows the posture of FPC 90 in PDA 30 in the state of FIG. 1(B) (first posture). In FIGS. 5 to 7 discussed below, longitudinal dimensions are exaggerated to help understand the state of FPC 90. Referring to FIG. 5, in the first posture, the second-housing-side end portion 94 is reversed to the lower side in the middle, and connected by means of a connector, not shown, to a circuit in the second housing 42. The first-housing-side end portion 96 is reversed to the upper side in the middle, and connected by means of a connector, not shown, to a circuit in the first housing 40. The central portion 92 is in an extended state. FPC guide 78 described above is formed at a position to be in contact with the longer side of central portion 92 in this state. With the longer side of central portion 92 being in contact with FPC guide 78, movement of FPC 90 over FPC guide 78 is restricted.

FIG. 6 shows the posture of FPC 90 in PDA 30 in the state of FIG. 1(A) (second posture). Referring to FIG. 6, in the second posture, the second-housing-side end portion 94 and the first-housing-side end portion 96 maintain the postures similar to FIG. 5, relative to the second housing 42 and the first housing 40, respectively. On the other hand, the end portion of central portion 92 on the side of first-housing-side end portion 96 is moved, guided by FPC guide 78, by the distance Ly upward to the left in FIG. 6 as the first housing slides and moves. The end portion on the side of second-housing-side end portion 94 is fixed to the second housing 42 and, therefore, the end portion is folded at two positions in the middle, as shown in FIG. 6. As a result, even when PDA 30 is in the second posture, electrical connection between the first and second housings 40 and 42 is maintained by FPC 90. For the movement shown in FIG. 6, it is necessary to prevent central portion 92 from twisting. As the FPC guide 78 is provided to limit lateral movement of FPC 90 over the guide, the movement such as shown in FIG. 6 becomes possible.

FIG. 7 shows the posture of FPC 90 in PDA 30 in the state of FIG. 1(C) (third posture). Referring to FIG. 7, in the third posture, as the first housing 40 slides to the left, the first-housing-side end portion 96 moves to the left as represented by an arrow 100 and, on the contrary, the second-housing-side end portion 94 moves to the right relative to central portion 92, as represented by an arrow 98, with central portion 92 kept in the extended state. Then, the movement stops when the first housing 40 has moved by the distance Lx relative to the second housing 42.

As shown in FIGS. 5 to 7, by FPC 90, electrical connection between the second housing 42 and the first housing 40 can be maintained in any of the first, second and third postures.

PDA 30 in accordance with the first embodiment as described above is used in the following manner. By way of example, for receiving TV broadcast and displaying on main display 46, PDA 30 is set to the first posture shown in FIG. 1(B). In this state, unnecessary buttons and the like are all hidden, and hence, there is no possibility of erroneous operation caused by unintended pressing of any button.

When characters are to be input at high-speed for writing an e-mail or drafting a document, PDA 30 is used in the second posture shown in FIG. 1(A). Input/output devices for inputting sentences at high speed such as main keys 52 and cursor key 54 are all available, and therefore, it is possible to form desired sentences at far higher speed than when the number of available keys is limited, as in the case of a conventional portable telephone.

To change a channel while viewing TV broadcast or to change sound volume, or to play a game using main display 46, the PDA is set to the third posture shown in FIG. 1(C). In the third posture, minimum keys necessary for game operation or TV operation such as cursor key 54 are available while other keys are unexposed. Therefore, there is little possibility of erroneous operation caused by unintended pressing of an unrelated key while viewing TV broadcast or playing a game. Further, in the third posture, it is possible to display, for example, broadcast of a different channel on sub-display 58. Therefore, though it is a portable PDA, it allows the user to enjoy TV broadcast in various different manners.

The space where sub-display 58 is provided would have been an unused dead space if PDA 30 could assume only the first and second postures. Effective use of the space allows implementation of various functions not available in conventional portable terminals. For instance, by providing sub-display 58 in this space, it becomes possible to confirm an image when the terminal is used as a camera, using not the main display 46 but sub-display 58 of smaller power consumption as the finder. It is unnecessary to provide a sub-display used only as the finder on the surface of first housing 40, and thus, surfaces of the first and second housings 40 and 42 can be used effectively.

As described above, in PDA 30 as the portable terminal in accordance with the present embodiment, the first and second housings 40 and 42 change their positions to assume any of the three postures through translation without rotation. Input/output devices provided on the second housing 42 are exposed in different configurations in different states. Specifically, the devices are not at all exposed, most of the devices are exposed or only a part of the devices are exposed. Therefore, any of the three postures described above may be selected in consideration of the types and numbers of the input/output devices to be used, and thus, a portable terminal supporting TV broadcast and relatively free of erroneous operation during use can be provided.

Second Embodiment

In the embodiment described above, the first housing 40 entirely covers the upper surface 50 of second housing 42 in the first posture. Therefore, in the first posture, input/output devices are not at all exposed, eliminating possibility of erroneous operation during watching TV broadcast. It is necessary, however, to change the state to the third posture, to switch a channel.

In such a situation, there may naturally be a desire among users to change the channel of TV broadcast while keeping the first posture, even if that leads to a slightly higher possibility of erroneous operation.

Figure 8:
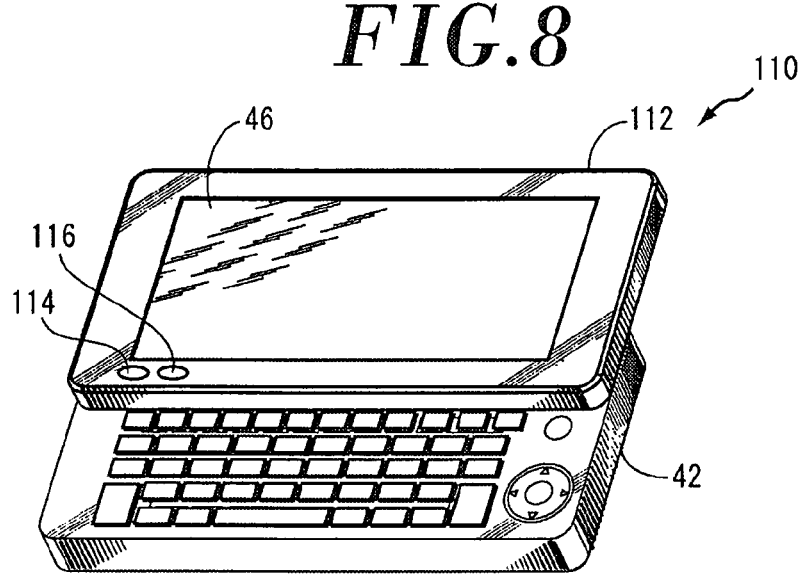
FIG. 8 shows an appearance of a PDA 110 as a portable terminal in accordance with a second embodiment of the present invention, in its second posture.

To meet such a demand, a channel switch button, which can be operated in the first posture, may be provided. FIG. 8 shows an appearance of a PDA 110 as an example having such a button, in the second posture. Referring to FIG. 8, PDA 110 includes, in place of the first housing 40 of PDA 30 in accordance with the first embodiment, a first housing 112 having channel switch buttons 114 and 116 provided closer to main display 46. Though not shown, PDA 110 can assume, similar to PDA 30 in accordance with the first embodiment, the first, second and third postures shown in FIG. 1, by sliding the first housing 112 either in the longitudinal direction or lateral direction relative to the second housing 42, through translation.

Channel switch buttons 114 and 116 can be operated regardless of the posture of PDA 110. Therefore, even in the first posture, TV broadcasting channel can be switched by operating channel switch buttons 114 and 116. It is unnecessary to change the posture of PDA 110 to the third posture in order to switch the channel. Possibility of erroneous operation naturally increases as channel switch buttons 114 and 116 are always accessible. It is a trade-off between improved operability and prevention of erroneous operation, and the arrangement shown in FIG. 8 is considered sufficiently useful.

Third Embodiment

In the first embodiment, sub-display 58 is adopted as an input/output device exposed only in the third posture. The present invention, however, is not limited to such an embodiment, and various other input/output devices may be provided at this position.

Figure 9:
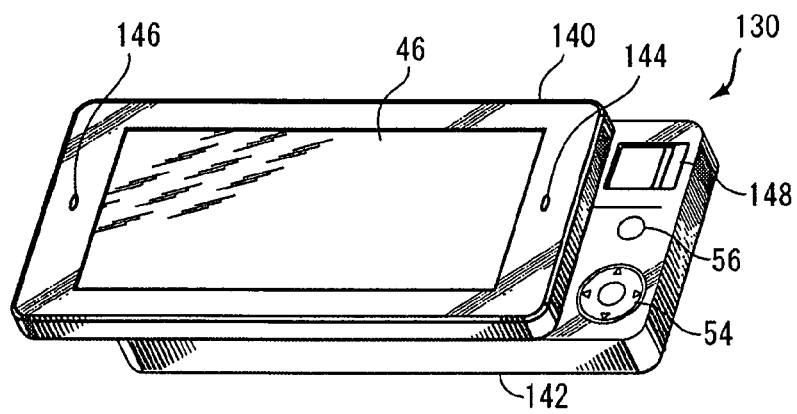
FIG. 9 shows an appearance of a PDA 130 as a portable terminal in accordance with a third embodiment of the present invention, in its third posture.

FIG. 9 shows an appearance of a PDA 130 having a function of portable telephone in accordance with a third embodiment, in the third posture. PDA 130 includes first and second housings 140 and 142, and these housings can assume any of the first, second and third postures, similar to the first and second housings 40 and 42 of PDA 30 in accordance with the first embodiment.

The second housing 142 is the same as the second housing 42 of PDA 30, except that in place of sub-display 58 provided on the second housing 42, a fingerprint sensor 148 is provided. First housing 140 is the same as the first housing 40 of PDA 30, except that a microphone 144 and a speaker 146 are provided on left and right sides of main display 46 (up and down sides when PDA 130 is used in portrait arrangement), so as to allow use of PDA 130 as a portable telephone.

PDA 130 has fingerprint sensor 148 at the position that is exposed only in the third posture, and higher security is assured utilizing a space not used conventionally.

Fourth Embodiment

Figure 10:
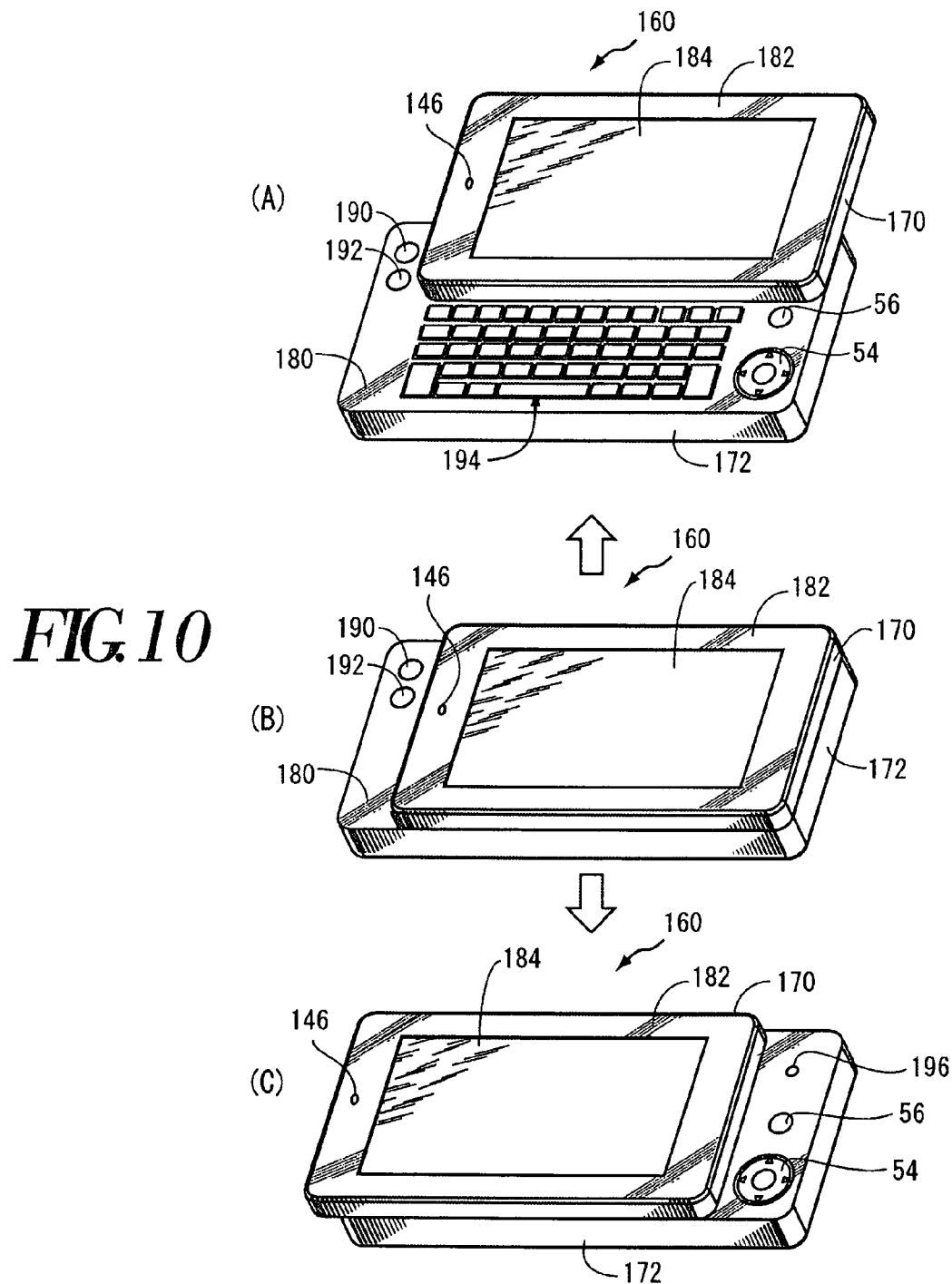
FIG. 10 shows three postures of a PDA 160 as a portable terminal in accordance with a fourth embodiment of the present invention.

In any of the embodiments described above, in the first posture, the upper surface of the second housing 42 or 142 is entirely covered by the first housing 40 or 140, and hence, input/output devices arranged on the upper surface of second housing 42 or 142 are not at all exposed. The present invention, however, is not limited to such embodiments. In PDA 160 having the function of a portable telephone in accordance with the fourth embodiment shown in FIG. 10, a part of the first housing is exposed even in the first posture, and the input/output device existing at that portion can be used.

FIG. 10(B) shows an appearance of PDA 160 in accordance with the fourth embodiment in the first posture, FIG. 10(A) shows an appearance in the second posture, and FIG. 10(C) shows an appearance in the third posture.

Referring to FIG. 10(B), PDA 160 includes a first housing 170 having an upper surface 182 with a display 184 provided at the center, and a second housing 172 having an upper surface 180 having channel switch buttons 190 and 192 on the left end and assembled to the first housing 170 such that upper surface 180 is covered by the first housing 180 except for the left end area where channel switch buttons 190 and 192 are provided in the first posture. On the left side of display 184 (when PDA 150 is used in the portrait arrangement, upper side), a speaker 146 is provided. Different from PDA 130 shown in FIG. 9, in PDA 160, no speaker is provided on upper surface 182 of first housing 170.

In PDA 160, the left end area of upper surface 180 of second housing 172 is exposed in the first posture. Therefore, channel switch buttons 190 and 192 may be operated, and switching from the first posture to another posture for changing the channel while viewing TV is unnecessary.

Referring to FIG. 10(A), by sliding the first housing 170 upward in the figure, PDA 160 is set to the second posture. In the second posture, main keys 194 provided slightly to the left from the center of upper surface 180 of second housing 172, cursor key 154 and enter key 56 are exposed. Therefore, in this posture, it is possible to input sentences at a high speed using display 184, main keys 194, cursor key 54 and enter key 56. Further, in the second posture also, channel switch buttons 190 and 192 are exposed, and therefore, it is possible to change the channel without changing the posture of PDA 160, while viewing TV on display 184.

Referring to FIG. 10(C), by sliding the first housing 170 to the left from the first posture, PDA 160 is set to the third posture. In the third posture, in addition to cursor key 54 and enter key 56 provided on the upper surface 180 of second housing 172, the area where sub-display 58 is provided in the first embodiment is exposed. In the present embodiment, a microphone 196 is provided at this position. Therefore, when longitudinally held in this state, PDA 160 can provide the telephone function utilizing microphone 196 and speaker 146.

In the third posture, channel switch buttons 190 and 192 are hidden by the first housing 170 and, therefore, there is no possibility of pressing these buttons erroneously.

As described above, according to the embodiments of the present invention, in the first posture as the base posture, input/output devices other than the main display are not at all or only partially exposed to the outside. Therefore, possibility of erroneous operation by an unintended touching of an input/output device that is not to be manipulated can be reduced. In the second posture, main keys including a large number of keys are exposed, and cursor key 54 and enter key 56 are also exposed. High-speed input of sentences becomes possible using these keys and, therefore, this posture is optimal for applications for creating mails and writing sentences. Further, in the third posture, keys larger in number than in the first posture but smaller than in the second posture are exposed. Therefore, it can suitably be used for an application that requires operation of not many buy only a small number of keys, such as an application for telephone function, and possibility of erroneously touching an unintended key during use can be reduced. As a result, the PDA in accordance with the embodiments of the present invention can be used in a form optimal for the function desired by the user, and as a result, optimal input function is realized while possibility of erroneous operation can be reduced. Consequently, the user can comfortably use the PDA without paying much attention to its operation.

The embodiments above are all directed to PDAs. The present invention is applicable not only to PDAs but also to multi-functional portable telephones, remote controllers, portable music players, portable data storage devices and the like, as can be clearly understood from the foregoing description.

Further, in the embodiments described above, the first and second housings both have flat, approximately rectangular box shapes. The shape of housings is not limited to a rectangular box. For example, the housing may have elliptical or oval planer shape. Further, the first and second housings may not have the same shape.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A portable terminal, comprising:
    a first housing having a first surface with a display arranged, and a second surface as a rear surface of said first surface;
    a second housing having a single operating surface that opposes the second surface of the first housing, the single operating surface having a plurality of input devices for operation of an application using said display, said plurality of input devices including,
        a first device having a first operating surface for operation of an application including using of said display,
        a second device having a second operating surface, provided independently from the first operating surface, for operation of the application, and
        a third device provided independently from the first device and the second device and having at least one of an input part and an output part;
    a first translation mechanism coupling said first housing to said second housing in a manner allowing translation movement of said housing along a prescribed first trajectory relative to said second housing, between a first posture in which said first device, said second device, and said third device are covered by said second surface and a second posture in which only said first device and said second device are exposed; and
    a second translation mechanism coupling said first housing to said second housing in a manner allowing translation movement of said first housing along a second trajectory different from said first trajectory relative to said second housing, between said first posture and a third posture in which only said second device and said third device are exposed.

2. The portable terminal according to claim 1, wherein the first device includes a keypad.

3. The portable terminal according to claim 1, wherein the second device includes a cursor key.

4. The portable terminal according to claim 1, wherein the third device includes a sub-display.

5. The portable terminal according to claim 1, wherein the third device includes a finger print scanner.

6. The portable terminal according to claim 1, wherein the third device includes a microphone.

7. A portable terminal, comprising:
- a first housing having a first surface with a display arranged, and a second surface as a rear surface of said first surface;
- a second housing having a first surface that opposes the second surface of the first housing; and
- a coupling mechanism coupling said first housing and said second housing to each other; wherein
- said coupling mechanism includes
- a first translation mechanism coupling said first housing to said second housing in a manner allowing translation movement of said first housing relative to said second housing along a prescribed first trajectory, between a first posture in which said first surface of said second housing is covered by said second surface of said first housing and a second posture in which said first surface of said second housing is exposed,
- a second translation mechanism coupling said first housing to said second housing in a manner allowing translation movement of said first housing relative to said second housing along a second trajectory different from said first trajectory, between said first posture and a third posture in which said first surface of said second housing is exposed; and
- an FPC (flexible printed circuit) that electrically connects the first housing and the second housing,
- wherein each of said first translation mechanism and said second translation mechanism includes a slide guide formed in the second surface of the first housing, and a member provided on the first surface of the second housing that slidably engages the slide guide,
- each of said slide guide includes,
  - a first straight side portion that allows the relative movement of the first housing along the first trajectory,
  - a second straight side portion, extending from the first straight side portion, that allows the relative movement of the first housing along the second trajectory,
- wherein a length of the first straight side portion is different from a length of the second straight side portion, and
- wherein the second surface of said first housing is provided with a FPC guide for restricting movement of said FPC during the translation movement of said first housing relative to said second housing.

8. The portable terminal according to claim 7, wherein the FPC includes a first-housing-side end portion and a second-housing-side end portion parallel to each other, and a central portion connecting the end portions, and wherein the first-housing-side end portion is connected to a circuit in the first housing, and the second-housing-side end portion is connected to a circuit in the second housing.

9. The portable terminal according to claim 8, wherein the first-housing-side end portion is reversed to the upper side in the middle, and connected to a circuit in the first housing.

10. The portable terminal according to claim 9, wherein the second-housing-side end portion is reversed to the lower side in the middle, and connected to a circuit in the second housing.

11. The portable terminal according to claim 10, wherein in the first posture, the longer side of the central portion is in contact with the FPC guide, and movement of FPC guide is restricted.

* * * * *